US008535750B2

(12) United States Patent
Ko et al.

(10) Patent No.: US 8,535,750 B2
(45) Date of Patent: Sep. 17, 2013

(54) GRANULAR LECITHINS, GRANULAR LYSOLECITHINS, PROCESS FOR THEIR PRODUCTION AND COMPOSITIONS CONTAINING THEM

(75) Inventors: Myong Kon Ko, Lakeville, MN (US); Heidi Schmitt, Aumuehle (DE); Michael Schneider, Freinsheim (DE); John Van De Sype, Semmerzake (BE)

(73) Assignee: Cargill, Incorporated, Wayzata, MN (US)

(*) Notice: Subject to any disclaimer, the term of this patent is extended or adjusted under 35 U.S.C. 154(b) by 992 days.

(21) Appl. No.: 11/914,727

(22) PCT Filed: May 16, 2006

(86) PCT No.: PCT/US2006/018880
§ 371 (c)(1),
(2), (4) Date: Oct. 30, 2008

(87) PCT Pub. No.: WO2006/124870
PCT Pub. Date: Nov. 23, 2006

(65) Prior Publication Data
US 2009/0074942 A1   Mar. 19, 2009

Related U.S. Application Data

(60) Provisional application No. 60/681,794, filed on May 17, 2005.

(51) Int. Cl.
*A23J 7/00* (2006.01)
(52) U.S. Cl.
USPC .............................. 426/662; 554/80; 554/83
(58) Field of Classification Search
USPC ...................... 426/662; 554/80, 83
See application file for complete search history.

(56) References Cited

U.S. PATENT DOCUMENTS

| | | | | |
|---|---|---|---|---|
| 3,012,888 A | * | 12/1961 | Davis et al. | 426/662 |
| 3,920,857 A | * | 11/1975 | Barker et al. | 426/307 |
| 4,164,594 A | * | 8/1979 | Jackson et al. | 426/662 |
| 4,762,658 A | * | 8/1988 | Rothfuss et al. | 264/122 |
| 4,803,016 A | * | 2/1989 | Binderman et al. | 554/83 |
| 5,310,734 A | * | 5/1994 | Losch et al. | 514/78 |
| 5,543,169 A | | 8/1996 | Colarow et al. | |
| 5,597,602 A | * | 1/1997 | Peter et al. | 426/478 |
| 6,140,519 A | * | 10/2000 | Hutton et al. | 554/83 |
| 6,288,130 B1 | * | 9/2001 | Heidlas et al. | 516/56 |
| 6,797,835 B2 | * | 9/2004 | Fussbroich et al. | 554/80 |
| 7,465,717 B2 | * | 12/2008 | Dexter et al. | 514/78 |
| 2003/0104076 A1 | | 6/2003 | Berkulin et al. | |
| 2005/0170063 A1 | * | 8/2005 | Chordia et al. | 426/601 |

FOREIGN PATENT DOCUMENTS

| | | |
|---|---|---|
| DE | 973741 | 5/1960 |
| DE | 2834851 | 2/1980 |
| EP | 0 354 442 | 2/1990 |
| EP | 0 521 398 | 1/1993 |
| WO | WO 2005/023011 | 3/2005 |
| WO | WO 2005/048731 | 6/2005 |

OTHER PUBLICATIONS

Rose, Arthur et al. 1966. The Condensed Chemical Dictionary, 7th edition. Reinhold Publishing Corporation, New York. p. 552.*
European Office Action in European Application No. EP06759914.2, dated Jan. 11, 2010, 4 pages.
European Office Action in European Application No. EP06759914.2, dated May 24, 2012, 4 pages.
European Office Action in European Application No. EP06759914.2, dated Jun. 21, 2013, 5 pages.
International Search Report and Written Opinion in International Application No. PCT/US2006/018880, mailed Aug. 17, 2006, 8 pages.
International Preliminary Report on Patentability in International Application No. PCT/US2006/018880, issued Nov. 20, 2007, 6 pages.
Van Nieuwenhuyzen, "Lecithin production and properties," 53(6):425-427 *J. Amer. Oil Chemists' Society*, 1976, 53(6):425-427.

* cited by examiner

*Primary Examiner* — Carolyn Paden

(57) ABSTRACT

There is disclosed a granular lecithin and the use in many applications, such as nutraceutical compositions. Also disclosed is a process for producing granular lecithins and compositions containing lecithins.

17 Claims, No Drawings

GRANULAR LECITHINS, GRANULAR LYSOLECITHINS, PROCESS FOR THEIR PRODUCTION AND COMPOSITIONS CONTAINING THEM

CROSS-REFERENCE TO RELATED APPLICATIONS

This application is a National Stage application under 35 U.S.C. §371 and claims benefit under 35 U.S.C. §119(a) of International Application No. PCT/US2006/018880 having an International Filing Date of May 16, 2006, which claims the benefit of priority of 60/681,794 having a filing date of May 17, 2005.

FIELD OF THE DISCLOSURE

The present disclosure relates to novel granular lecithins, novel granular lysolecithins, a process for producing granular lecithins and granular lysolecithins, and compositions containing the novel granular lecithins and novel granular lysolecithins.

BACKGROUND OF THE DISCLOSURE

Lecithin is widely used as an emulsifier and solubilizer in the food, feed, pharmaceutical and cosmetic industries. Lecithin is available in powder and granular form. Lysolecithin is available in powder form, and is said to be expected to be useful as an emulsifier and as a solubilizer in foods, cosmetics and drugs.

There is a continuing need for novel granular lecithins and a method for preparation of granular lecithins. There is also a need for novel lysolecithins that are in granular form, and a process for preparing granular lysolecithins. Also desired are compositions containing the novel granular lecithins and novel granular lysolecithins.

SUMMARY OF THE DISCLOSURE

In one embodiment, the present disclosure is directed to novel granular lecithins that are characterized by having a content of up to 47%, preferably up to about 31%, more preferably up to about 13%, and more preferably, from about 13 to about 31%, of fines less than 1 mm size, as determined in accordance with the friability test described herein, and by having a value of up to 26, preferably, about 19 to a value of 26, as determined in accordance with the sensory analysis test procedure described herein using an E-Nose 5000 equipped with a sensor type 20375.

In another embodiment, the present disclosure relates to lysolecithins that are in granular form. Lysolecithin as used herein is defined as deoiled, enzymatically hydrolyzed powdered soybean lecithin.

In another embodiment, the present disclosure relates to a process for producing granular lecithins and lysolecithins that are in granular form. The process comprises producing a film from a lecithin or lysolecithin powder, and milling the resultant film at a temperature of less than or equal to 0° C. in the absence of binder, antisticking agent, or mixtures thereof. If desired, the resultant lecithin or lysolecithin granules may be sieved to obtain any desired fraction of granules.

In another embodiment, the process relates to the lecithin granules and to the lysolecithin granules that result from the process for producing the granules.

In another embodiment, the present disclosure relates to compositions comprising the novel granular lecithins and/or the novel granular lysolecithins described herein and a process for producing such compositions. Preferably the lecithin or lysolecithin-containing compositions are nutraceutical compositions, pharmaceutical compositions, food compositions, flavor compositions, and pigment compositions.

DETAILED DESCRIPTION OF THE DISCLOSURE

In one embodiment, the present disclosure is directed to novel granular lecithins that are characterized by having a content of up to 47%, preferably up to about 31%, more preferably up to about 13%, and more preferably, from about 13 to about 31%, of fines less than 1 mm size, as determined in accordance with the friability test described herein, and by having a value of up to 26, preferably, about 19 to a value of 26, as determined in accordance with the sensory analysis test procedure described herein using an E-Nose 5000 equipped with a sensor type 20375.

In another embodiment, the present disclosure relates to lysolecithins that are in granular form. Lysolecithin as used herein is defined as deoiled, enzymatically hydrolyzed powdered soybean lecithin.

In another embodiment, the present disclosure relates to a process for producing granular lecithins and lysolecithins that are in granular form. The process comprises producing a film from a lecithin or lysolecithin powder, and milling the resultant film at a temperature of less than or equal to 0° C. in the absence of binder, antisticking agent, or mixtures thereof. If desired, the resultant lecithin or lysolecithin granules may be sieved to obtain any desired fraction of granules.

In another embodiment, the process relates to the lecithin granules and to the lysolecithin granules that result from the process for producing the granules.

In another embodiment, the present disclosure relates to compositions comprising the novel granular lecithins and/or the novel granular lysolecithins described herein and a process for producing such compositions. Preferably the lecithin or lysolecithin-containing compositions are nutraceutical compositions, pharmaceutical compositions, food compositions, flavor compositions, and pigment compositions.

In more detail, the starting material for the granular lecithins and process for producing granular lecithins herein is any deoiled lecithin preferably with an acetone insoluble matter of at least 90%, otherwise known as phospholipids. Lecithins generally are a complex, naturally occurring mixture of phospholipids and other polar lipids. The lecithins may comprise glycerols, fatty acids, phosphoric acid, amino alcohols, carbohydrates, and the like. The starting material may also be a deoiled fractionated lecithin that is a lecithin separated into subclasses or enriched fractions of lecithins. The enriched fractions may be a mixture enriched in phospholipids such as phosphatidyl choline, phosphatidyl ethanolamine, phosphatidyl inositol, phosphatidyl serines, phosphatidyl glycerol, phosphatidic acid, and the like.

The starting material for the granular lysolecithins and process for producing granular lysolecithins is any deoiled lysolecithin, preferably having an acetone insoluble matter of at least 90%. A suitable lysolecithin may be obtained by splitting off one fatty acid unit from a phospholipid.

The granular lecithins of the present disclosure are characterized by having values for the properties of friability, and sensory analysis with E-Nose, that are differentiable from comparative granular lecithins. Moreover, the property of friability is useful for the application quality of the granular lecithins, and the property of sensory analysis with E-Nose is significant from the consumer's reference point.

In addition to the properties of the granular lecithins that differ from comparative granular lecithins, the granular lecithins herein are generally characterized also by other useful properties. For example, the flowability of the present granular lecithins is comparable to the flowability of comparative granular lecithins. The granular lecithins herein are characterized by the properties of dispersibility and stability in water that are comparable to that of comparable granular lecithins. Further, dissolution in vegetable oil such as soybean oil of the present granular lecithins is comparable to that of comparative granular lecithins. The wettability of the granular lecithins herein is similar to that of comparative granular lecithins. The color of the granular lecithin and lysolecithin is comparable to that of comparative granular lecithins and lysolecithins. Properties of exemplary lysolecithins in granular form are included herein for informational purposes only. The properties of the granular lysolecithins may vary widely.

The process for producing granular lecithins and granular lysolecithins comprises forming a film from a lecithin or lysolecithin powder and milling the resultant film at a temperature of less than 0° C., in the absence of binder, antisticking agent, or mixture thereof.

The film forming operation may be carried out at any temperature, using any method or means known for producing films. For example, films may be formed by means of compression using, for example, a roller compaction granulator. A suitable example of a roller compaction granulator is a Vector Fruend Model TF 156 roller compaction granulator. Alternately, films may be produced by die pressing. The resultant film is then milled to produce granules of the lecithin and lysolecithin from the film. Any means for milling the film to produce granules may be used. The milling of the film to produce the granules is carried out at a temperature of less than or equal to 0° C. The milling unit may be adapted to include a conical screen mill, a mesh screen mill, or knife milling, to produce granular lecithin or lysolecithin. Preferably, a mesh screen mill is used.

If desired, materials other than binder, antisticking agent or mixture thereof, may be combined with the lecithin or lysolecithin powder prior to introduction into the feed inlet of a film forming means such as a roller compaction granulator. In such instance, a V-blender or any other conventional method for mixing may be used.

During the production of the film, process parameters of the film forming means, such as feed screw speed, roller speed, roller clearance, and compression pressure generally vary with the equipment used, and/or the material being formed into films.

Thereafter, the resultant film is ground or chopped in a mill to provide granules of a desired size range. As mentioned any milling means may be used. A suitable milling means is the milling portion of the Vector Fruend Model TF156 roller compaction granulator. Any size can be produced, depending on the mesh size screen used. For example, particle sizes in the range of 0.8 mm to 1.25 mm (14-25 mesh) are generally suitable for nutraceutical products and other dietary supplements. Typically, the granular particles are sorted by screening, and particles which are not in the desired size range can be recycled through the process, with larger granulars recycled for further milling. The milling operation is carried out at a temperature of less than or equal to 0° C. Preferably, the temperature ranges from 0° C. to about −25° C., and more preferably from about −10° C. to about −20° C. Such cooling may be effected in any known manner, such as by passing liquid nitrogen through the milling means.

In another embodiment, the starting lecithin and lysolecithin powders are maintained at a temperature of from below 0° C. to about 40° C., preferably about −10° C. to about 40° C., prior to introduction into the film forming means.

If desired, additives other than binder, antistick agent, or mixtures thereof, may be mixed with the lecithin and lysolecithin powder to provide compositions that are formed into films and then milled to provide granules, using the process as described above for producing granular lecithins and lysolecithins. In brief, the process comprises forming a film from a lecithin-containing or lysolecithin-containing mixture, and then milling the resultant film at a temperature of less than or equal to 0° C., in the absence of binder, antistick agent, or mixture thereof, to provide granular lecithin-containing or lysolecithin-containing compositions.

Any suitable additive other than binder, antistick agent, or mixture thereof, may be mixed with the lecithin and lysolecithin powder, prior to forming the granular compositions. The resultant granular compositions are useful for many purposes, including cosmetics, medicaments, nutritional supplements, food and drug preparations, and the like. For example, there may be mixed with the lecithin and lysolecithin powder, fragrances, oils, moisturizers, vitamins, UV blockers, humectants, cleaning agents, nutritional supplements, herbal extracts, fatty acids, drugs, phytochemicals, amino acids, mixtures thereof, and the like. The compositions may also contain conventional viscosity and flow control agents, antioxidants, pigments, defoamers, decolorizing agents, dyes, lubricants, foodstuffs, pharmaceuticals, nutraceuticals, flavors, colorings and the like.

As used herein, a nutraceutical includes any food, food supplement or dietary supplement that is believed to provide health or medical benefits. A pharmaceutical includes any therapeutically active or preventative substance.

Other suitable additives include nutrients such as vitamins, amino acids, antioxidants such as coenzyme Q, proteolytic and any other enzymes, terpenes, limonoids, carotenoids, phytosterols, phenols, flavones, flavonols, flavanones, catechins, thiols, indoles, and the like.

The compositions of the present invention can also contain any combination of medicinal compounds. Such medicinal compounds include, but are not limited to, antilipemic agents, antimicrobials, antibiotics, antifungal agents, antiviral agents, antithrombogenic agents, anesthetics, anti-inflammatory agents, analgesics, anticancer agents, and wound healing agents. Suitable antimicrobial agents include, but are not limited to, biguanide compounds, such as chlorhexidine and its salts; triclosan; penicillins; tetracyclines; quinolones, such as oxolinic acid, norfloxacin, nalidixic acid, pefloxacin, sulfonamides; nonoxynol 9; cephalosporins; and combinations of such compounds and similar compounds.

In a preferred embodiment the lecithin and/or lysolecithin powder is combined with an active material, such as a nutraceutical substance. Other active materials, can also be used, alone or in combination with nutraceuticals or other additives. These include, for example, poorly bioavailable substances in general, including foods, feeds, and pharmaceuticals, to improve the bioavailability of these substances; poorly soluble or poorly dispersible substances in general, again including foods, feeds and pharmaceuticals, to improve the solubility and/or dispersibility of these substances; bitter or otherwise bad tasting substances in general, to mask bitterness or bad taste; substances which could affect the stomach wall (e.g. drugs like aspirin, indomethacin, and other NSAIDs), to reduce irritation; and proteins, including hydrolyzed proteins and enzymes, to improve physiological performance of these substances or to protect them from environmental influences, including destructive effects of the digestive system. Inactive consumable ingredients such as flavors, sweeteners, and colors can also be included.

In one embodiment, at least one active ingredient in the composition is a nutraceutical substance. Nutraceuticals which may be incorporated into lecithin-containing granules, in accordance with the invention, include, for example, vitamins, amino acids, enzymes, minerals, trace elements, glucosamine, chondroitin, pectin, flavonoids, isoflavonoids, lignins, carnosine, polyunsaturated fatty acids, antioxidants, such as anthocyans, proanthocyanidines, and carotinoides (e.g. lutein and lycopene, as noted above, as well as astaxanthin or zeaxanthin), phytin, phytic acid, policosanols, policosanoic acids, montanic acids, pyruvates, and various other phospholipids, such as phosphatidylserine or phosphatidylethanolamine. Also included are various plant extracts, such as green tea extract or artichoke leaf extract. Other plant extracts include those disclosed, for example, in U.S. Patent Appn. No. 2003/0104076. which is incorporated herein by reference. Vitamins include especially Vitamin A, B-complex, C, D, E, K, P-carotene, nicotinamide, folic acid, and NADH, as well as Coenzyme Q10 and L-carnitine, noted above. Minerals and trace elements include especially calcium, magnesium, sodium, potassium, chromium, iodine, manganese, copper, iron, zinc, vanadium, phosphorus, and selenium, in physiologically acceptable form.

The granular lecithin and the granular lysolecithin-compositions comprise granular lecithin and/or granular lysolecithin in any suitable amount. For example, the granular lecithin or lysolecithin compositions may comprise the lecithin or lysolecithin in amounts of 0.01% to 99.99% by weight. The additive to be combined with the lecithin or lysolecithin may comprise an amount of about 0.01% to about 99.99% by weight. The amount used may be selected to reflect the desired effect of the composition.

The following are exemplary nutraceutical compositions comprising a lecithin or lysolecithin powder and a nutrient that are expected to support the physiological activity or consumer attractiveness of the lecithin or lysolecithin, or the activity/bioavailability of the added component.

(a) A composition comprising a lecithin powder or a lysolecithin powder, and a blend of phytosterols and phytostanols, such as COROWISE phytosterol mixture available from Cargill, Incorporated. The two components (that is, lecithin or lysolecithin and the phytosterol/phytostanol component) are preferably present in a ratio of 5:1 (lecithin or lysolecithin: phytosterol/phytostanol) or greater; i.e. 1 g of phytosterol/phytostanol in 6 g of granules. Other ratios may include, for example, 7:1, 10:1, 20:1, 50:1, or 100:1.

(b) A composition comprising a lecithin powder or a lysolecithin powder, and Coenzyme Q10. The Coenzyme Q10 component is preferably present in an amount of about 0.4% or less; for example, 1, 5, 10, 15, 20 or 25 mg in 6 g of lecithin or lysolecithin containing granules.

(c) A composition comprising a lecithin powder or a lysolecithin powder, and lycopene. The combination provides a powerful antioxidant with a balanced combination of phospholipids. The lycopene component is preferably present at a level of about 0.1% or less; for example, 0.5, 1, 2, 2.5, 3, 4, or 5 mg lycopene in 6 g of lecithin-containing granules, or lysolecithin containing-granules.

(d) A composition comprising a lecithin powder or lysolecithin powder, and lutein. The combination provides improved bioavailability of lutein for prevention of AMD (age-related macular degeneration). The lutein component is preferably present at a level of about 0.1% or less; for example, 0.5, 1, 2, 2.5, 3, 4, or 5 mg Q10 in 6 g lecithin-containing granules, or lysolecithin-containing granules.

(e) A composition comprising a lecithin powder or a lysolecithin powder, and creatine. The two components (that is lecithin or lysolecithin and creatine, which may be provided as the monohydrate) are preferably present in a ratio of 2:1 (lecithin or lysolecithin/creatine) or greater. Other ratios may include, for example, 3:1. 4:1, 5:1, 7:1, 10:1, 20:1, 50:1, or 100:1.

(f) A composition comprising a lecithin or a lysolecithin powder, and carnitine. The two components (that is lecithin or lysolecithin and L-carnitine) are preferably present in a ratio of 2:1 or greater. Other ratios may include, for example, 3:1. 4:1, 5:1, 7:1, 10:1, 20:1, 50:1, or 100:1.

(g) A composition comprising lecithin powder or a lecithin powder and a vitamin A, E and B6 mixture. The three vitamin components (that is vitamin A, E, B6 may be provided as mixture on a maltodextrine carrier) are preferably present in a level of vitamin A 4000 IU, vitamin E 80 mg and vitamin B6 30 mg in the granules or less.

In each of formulations (a)-(g) above, a therapeutic daily dose would consist of about 6 g of lecithin or lysolecithin-containing granules containing the minimum ratios of lecithin or lysolecithin/nutraceutical component noted above. Administration as a dietary supplement would employ a lower daily amount of the non-lecithin component.

The following examples are presented to illustrate the present invention and to assist one of ordinary skill in making and using the same. The examples are not intended in any way to otherwise limit the scope of the invention.

EXAMPLES

The following test procedures are utilized in evaluating the properties of the lecithin granules and lysolecithin granules provided in the examples.

Test Procedures

The materials used in the following examples are as follows. The lecithin powder utilized was AQUAGRAN CP IPM deoiled coarse soya lecithin powder available from Cargill, Incorporated. The lysolecithin powder utilized was EPIKURON 100 E deoiled, enzymatically hydrolyzed, powdered soybean lecithin, enriched with lyso-phospholipids, available from Degussa AG.

The phytosterols used were a powdered mixture of vegetable oil phytosterols provided by Cargill, Incorporated under the tradename COROWISE, having as major components sitosterol (about 40-58%), campesterol (about 20-28%) and stigmasterol (about 14-23%). The Coenzyme Q10 used was a powdered product supplied by Asahi Kasei Pharma.

The vitamin used was supplied by Nutrilo GmbH, Germany, and comprises, per kilogram, 3.08 mg Vitamin A, 205.13 mg Vitamin E, and 76.92 mg Vitamin B6.

As control samples of lecithin and lysolecithin granules there were employed the following materials:

LECIGRAN 6000 G deoiled pure soya lecithin granules, available from Cargill, Incorporated.

LECIGRAN 6000 G IPM deoiled pure soya lecithin granules, non-GM, available from Cargill, Incorporated.

EPIKURON 100 G deoiled granulated soybean lecithin available from Degussa AG.

LECIGRAN 6000 P lot 2032 available from Cargill, Incorporated

Friability of Granules

This is a test to measure the friability, porosity, breaking of lecithin or lysolecithin granules. The equipment used is a Pharma tester-type PTF E, Hamburg, Germany. Specifically, there was used a PTF ER instrument, that is a double drum tablet friability tester where the speed of rotation is variable over the range of 20 to 70 rpm. The drums have a diameter of 300 mm, and each drum contains 5 metal balls with a total weight of 94 g and a diameter of 15 mm. There was used a Fritsch vibratory sieve shaker, Oder-Oberstein, Germany, where there is a sieve of W=1 mm, and a sieve of W=0.5 mm. 2×15 g of lecithin granules are weighed and put in each rotating drum, together with each 5 metal balls. The Pharma-tester is started for 4 minutes at 25 rpm (this is 100 returns in total). The metal balls fall on the granules (the stress factor). After the 100 returns, the total of 1 drum is put on the 1 mm sieve+the 0.4 mm sieve and is shaken for 5 minutes on the sieve shaker. The weight fraction of the granules on the 2 sieves is measured:

Sieve Fraction Granules ≥ 1 mm (%) =

$$\frac{Weight_{sieve+granules} - Weight_{sieve}}{15} \times 100$$

Sieve Fraction Granules ≥ 1 mm and ≥ 0.5 mm (%) =

$$\frac{Weight_{sieve+granules} - Weight_{sieve}}{15} \times 100$$

Sensory Analysis with E-Nose

This is a test to measure volatile off-flavor compounds released from a sample. The test is carried out using an E-Nose 5000 apparatus, manufactured by Neotronics Scientific Ltd U.K., Serial No. 107-e5000-160, equipped with a type 20375 sensor.

A sample is placed into autosampler vials of 20 ml and a magnetic cap (containing PTFE coated septum) is then crimped tightly into place on the vial. Samples must be weighed accurately (0.1 gram) and contact with the septa of the vials should be avoided.

Incubation time and incubation temperature are the most important for optimum development of a headspace rich in volatiles. This has to be tested for each new ingredient type. A 15 minute total incubation time has been selected as being the most suitable; a relatively high incubation temperature (e.g. 60° to 80° C.) is necessary for weak flavored samples, lower t° for more intense smelling samples.

Agitation of the sample improves volatile release and an agitation speed of 500 rpm on for a time of 5 seconds and then off for 2 seconds was selected as most appropriate. Headspace sample volume injected into the E-Nose was established at 5 ml and optimum time for syringe flushing (to avoid contamination) with dry air or nitrogen was 2 minutes. In carrying out the procedure there are a minimum of two replicates. Vials containing air are used at the start as well as at the end of a measurement series.

Selection of the right sensor type and the conditions (trapped or continuous) to present the sample volatiles to these sensors is of crucial importance. Flow rate of the carrier gas, sample transfer and system cleanup needs to be adapted to the sample type and sensors used.

The test is carried out as follows:
1 gram lecithin sample or lysolecithin sample is weighed into the autosampler glass vial of 20 ml. While agitating the sample at 40° C., the headspace volatiles are formed.
5 ml of headspace sample volume is then injected into the E-Nose 5000.
Metal Oxide sensors (MOS) are the preferred sensor types. The sample is trapped for 90 seconds over these sensors. The sensor response of the 8 sensors is recorded after exactly 90 seconds. The higher the % sensor response, the more volatiles and the more intense is the off-flavor of the test sample.

Flowability

Flowability may be defined as the granule's ability to flow evenly, by means of gravity and other forces, from the top to the bottom of the hopper and then on to the dosage, compaction, and crushing chambers.

The basis for this method is the granule's ability to fall freely through a hole in a plate. The diameter of the smallest hole through which the granule passes three times out of three is taken as the flowability index. This method has proved easily reproducible. Each trial is considered valid when the granule that falls involves the entire height of the granule (not to be less than 60 mm)

The Flodex Powder Flowability tester (Hanson Research Corp., Northridge, Calif.) was used for testing intrinsic granule flowability, and consists of a cylinder with a series of replaceable disks; of different diameters; in the bottom; the hole is closed by a mobile shutter. The actual components of the system are as follows:

1. A stainless steel cylinder with an approximate capacity of 200 ml.
2. A series of stainless steel disks. Each disk has a precise hole in the center in graduated sizes differing 1-2 ml in diameter and is easily attached to form a bottom for the cylinder.
3. A shutter that covers the hole and that may be quickly removed without vibration to allow the granule to flow through the selected hole.
4. An adjustable funnel for loading the sample cylinder with a free fall of the test granule.
5. A suitable container to collect the granule that flows through the unit.

Method

A ring is secured to the bearing to allow the bottom of the funnel to be near but not touching the granule surface. A granule load of 50 g is then poured through the funnel into the middle of the cylinder. When loading is completed, 30 seconds must be allowed for possible formation of individual flocculi or mass flocculation of the whole load.

A lever device is operated to open the hole in the disk quickly and without vibration. A very flowable granule will slowly flow through the small-diameter holes, leaving a cavity shaped like an upside-down truncated cone. A granule that flocculates in bulk, on the other hand, will fall abruptly, forming a cylindrical cavity. If the experiment is negative, i.e. if the granule falls as just described; the granule must be tested again with a disk having a larger hole.

$$Flowdex = \frac{1000}{Disk\ number}$$

Dispersibility, Stability and Wettability in Water

In determining dispersibility and stability, the lecithin or lysolecithin granules are brought into demineralised water under standard conditions and at 25° C. The dispersibility is the time it takes to dissolve all the granules. The stability is the time it takes before the homogenous dispersion is destabilized.

The equipment utilized in the determination of dispersibility and stability includes the following:
Glass beaker of 1000 ml
Magnetic stirring and heating equipment IKAMAG RCT IKA Werke, D-7813 Staufen (Janke & Kunkel GMBH & Co) Germany
Magnetic pill (3.8×0.8 mm)
Demineralised water
Measuring cylinder of 100 ml In carrying out the test procedure, the following procedure is followed:
Weigh 10 g of lecithin or lysolecithin powder/granules into a jar and close immediately;
Homogenize to avoid formation of lumps;
Take a clean dry beaker and pour 500 g of demineralised water into the beaker (2% concentration) at 25° C. Bring the weighed sample into the glass beaker (within 15 seconds), while stirring at 500 rpm and spread the product equally over the surface;
Start the chronometer and put the stirring on 750 rpm; and
Stop the chronometer when all the granules are dispersed into the water.

The time of total dispersibility is expressed in seconds.

After the total dispersing, the dispersion is put into a measuring cylinder of 100 ml and the destabilization is observed.

For determining wettability of the lecithin or lysolecithin, the granules are brought into water under standard conditions. The wettability is the time required to wet all the granules. In determining the wettability, there was used the following equipment:
Glass beaker of 1000 ml
Plastic plate (0.12 m×0.12 m)
Cylinder (Diameter: 0.075 m-Height: 0.065 m)

The procedure for determining wettability is as follows:
Weigh 10 g of lecithin or lysolecithin granules into a jar and close immediately;
Homogenize to avoid formation of lumps;
Take a clean dry beaker and pour very carefully 500 ml of demineralised water into the beaker;
Put the plastic plate on the beaker, on top the cylinder;
Bring the weighed sample into the cylinder and spread the product equally over the surface;
Start the chronometer. After exactly 1 minute, pull the plate away from the cylinder. The granule falls into the water; and
Stop the chronometer when all the granule is moistened (total time in seconds).
Time of wetting(s)=total time(s)−60 s
Dissolvability in Refined Soybean Oil In this test procedure, the dissolvability is the time required for dissolving all the lecithin or lysolecithin granules in refined soybean oil under standard conditions. In determining the dissolvability of granules in refined soybean oil, the following equipment was used.
Glass beaker of 1000 ml
Magnetic stirring and heating equipment IKAMAG RCT IKA Werke, D-7813 Staufen (Janke & Kunkel GMBH & Co) Germany
Magnetic flo (3.8×0.8 mm)
Refined, bleached, deodorized soybean oil
Measuring cylinder of 100 ml The procedure for determining dissolvability is as follows:
Weigh 10 g of lecithin or lysolecithin granules into a jar and close immediately;
Homogenize to avoid formation of lumps;
Take a clean dry beaker and pour very carefully 200 g of refined, bleached, deodorized soybean oil into the beaker (5% concentration). Heat this oil up to 60° C. while stirring;
Bring the weighed sample into the glass beaker (oil at 60° C.) while stirring at 500 rpm and spread the product equally over the surface;
Start the chronometer and put the stirring on 750 rpm; and
Stop the chronometer when all the granules are dissolved in the oil.

The time of dissolvability is expressed in seconds.

In the following examples, identified as L-1, L-2, L-3, L-4, L-6, L-7, and L-8 there was produced granular lecithin products. The lecithin powder utilized was AQUAGRAN CP IPM available from Cargill, Incorporated. Examples L-1, L-2, and L-4, are granular lecithins. Example L-3 is a granule comprising lecithin and the vitamin described herein; example L-6 is a granule comprising lecithin and COROWISE sterol; and examples L-7 and L-8 are granules comprising lecithin and Coenzyme Q-10 product. The granules were all produced using a Vector Freund model T156 roller compaction granulator wherein the milling operation was maintained at a temperature of below −12° C. In those instances where lecithin powder was combined with another component, the mixing was achieved in a V-blender (Patterson Kelley).

The process conditions used in producing the exemplary lecithin granules and the exemplary granules of lecithin-containing compositions are reported in Table 1.

TABLE 1

| Example No | Material | Feed Temp (° C.) | Feed Screw Speed (rpm) | Roller Speed (rpm) | Compression Pressure bar | Roller Clearance (inch) | Mill Screen (mesh) | Mill Speed (Hz) | Milling, Temp ° C. |
|---|---|---|---|---|---|---|---|---|---|
| L-1 | 100% lecithin | 11 | 20 | 11 | 50 | 0.119 | 8 | 25 | −12 |
| L-2 | 100% lecithin | <0 | 20 | 9-9.5 | 50 | 0.119 | 8 | 25 | −12 |
| L-3 | 99.66% lecithin 0.34% vitamin | <0 | 20 | 9 | 50 | 0.119 | 8 | 25 | −12 |
| L-4 | 100% lecithin | 20 | 20 | 9 | 50 | 0.119 | 8 | 25 | −12 |
| L-6 | 83.33% lecithin 16.67% sterols | <0 | 19 | 9.5 | 50 | 0.119 | 8 | 25 | −12 |
| L-7 | 99.6% lecithin 0.4% Co Q-10 | <0 | 19 | 9 | 50 | 0.119 | 8 | 25 | −12 |
| L-8 | 99.6% lecithin 0.4% Co Q-10 | <0 | 20 | 9 | 50 | 0.119 | 8 | 25 | −12 |

In Table 2 there are provided examples of granular lysolecithins, and granular compositions comprising lysolecithin and another component. The lysolecithin powder utilized was EPIKURON 100 E available from Degussa. In Table 2, the examples identified as Lysol-1, Lysol-2 and Lysol-4 are granular lysolecithins. The example identified as Lysol-3 is a granule comprising lysolecithin and Coenzyme Q-10. The example identified as Lysol-5 is a granule comprising lysolecithin and a vitamin. The example identified as Lysol-6 is a granule comprising lysolecithin and COROWISE sterols. The process conditions used in producing the exemplary lysolecithin granules and the exemplary granules of lysolecithin-containing compositions are reported in Table 2

TABLE 2

| Example No | Material | Feed Temp (° C.) | Feed Screw Speed (rpm) | Roller Speed (rpm) | Compression Pressure (bar) | Roller Clearance (inch) | Mill Screen (mesh) | Mill Speed (Hz) | Milling, Temp ° C. |
|---|---|---|---|---|---|---|---|---|---|
| Lysol-1 | 100% Lysolecithin | 20 | 20 | 9.6 | 50 | 0.077 | 10 | 25 | −12 |
| Lysol-2 | 100% Lysolecithin | 10 | 20 | 9-9.5 | 50 | 0.077 | 10 | 25 | −12 |
| Lysol-3 | 99.6% Lysolecithin 0.4% Co Q-10 | 20 | 30.4 | 8.2 | 50 | 0.092 | 10 | 25 | −12 |
| Lysol-4 | 100% Lysolecithin | 0 | 40 | 6 | 50 | 0.102 | 10 | 25 | −12 |
| Lysol-5 | 99.66% Lysolecithin 0.34% Vitamins | 20 | 10 | 6 | 50 | 0.077 | 10 | 25 | −12 |
| Lysol-6 | 83.33% Lysolecithin 16.67% sterols | 20 | 15.3 | 6 | 50 | 0.077 | 10 | 25 | −12 |

The evaluation of the granular lecithin samples, the granular lecithin-containing samples, the granular lysolecithin samples, and the granular lysolecithin-containing samples is shown in the following tables.

TABLE 3

Friability Test Procedure

| Example No. | | % Fines <1 mm |
|---|---|---|
| LECIGRAN 6000 G IPM Lot 2035 | | 71 |
| Degussa EPIKURON 100 G | | 48 |
| LECIGRAN 6000 G Lot 2032 | | 48 |
| L1 granules | 100% Lecithin | 13 |
| L2 granules | 100% Lecithin | 31 |
| L3 granules | 99.66% Lecithin 0.34% Vitamins | 40 |
| L4 granules | 100% Lecithin | 47 |
| L6 granules | 83.33% Lecithin 16.67% Sterols | 47 |
| L7 granules | 99.6% Lecithin 0.4% Co Q 10 | 38 |
| L8 granules | 99.6% Lecithin 0.4% Co Q 10 | 30 |
| Lysolecithin-1 | 100% Lysolecithin | 83 |
| Lysolecithin-2 | 100% Lysolecithin | 80 |
| Lysolecithin-3 | 99.6% Lysolecithin 0.4% Co Q 10 | 70 |
| Lysolecithin-4 | 100% Lysolecithin | 13 |
| Lysolecithin-5 | 99.66% Lysolecithin 0.34% Vitamins | 62 |
| Lysolecithin-6 | 83.33% Lysolecithin 16.67% Sterols | 30 |

The % fines <1 mm gives the degree of destruction of the granules according to the friability test procedure.

TABLE 4

Sensory Analysis with E-Nose

| Example No. | | Volatile Off-Flavor Compounds Released Using a Sensor Type 20375 |
|---|---|---|
| LECIGRAN 6000 G IPM Lot 2035 | | 61.22 |
| LECIGRAN 6000 G Lot 2032 | | 38.71 |
| Degussa EPIKURON 100 G | | 27.61 |
| L1 granules | 100% Lecithin | 18.93 |
| L2 granules | 100% Lecithin | 21.08 |

TABLE 4-continued

Sensory Analysis with E-Nose

| Example No. | | Volatile Off-Flavor Compounds Released Using a Sensor Type 20375 |
|---|---|---|
| L4 granules | 100% Lecithin | 25.73 |
| Lysolecithin L1 | 100% Lysolecithin | 4.81 |
| Lysolecithin L2 | 100% Lysolecithin | 9.10 |

TABLE 5

Flowability

| Example No. | | Flowdex (1000/Disk#) |
|---|---|---|
| LECIGRAN 6000 G IPM Lot 2035 | | 56-50 |
| Degussa EPIKURON 100 G | | 56 |
| LECIGRAN 6000 P Lot 2032 | | 100-83 |
| L1 granules | 100% Lecithin | 83-71 |
| L2 granules | 100% Lecithin | 83 |
| L3 granules | 99.66% Lecithin 0.34% Vitamins | 83-71 |
| L4 granules | 100% Lecithin | 100-83 |
| L6 granules | 83.33% Lecithin 16.67% Sterols | <38 |
| L7 granules | 99.6% Lecithin 0.4% Co Q 10 | 100 |
| L8 granules | 99.6% Lecithin 0.4% Co Q 10 | 100-83 |
| Lysolecithin-1 | 100% Lysolecithin | 40 |
| Lysolecithin-2 | 100% Lysolecithin | not enough material |
| Lysolecithin-3 | 99.6% Lysolecithin 0.4% Co Q 10 | 71-62 |
| Lysolecithin-4 | 100% Lysolecithin | 100 |

TABLE 5-continued

Flowability

| Example No. | | Flowdex (1000/Disk#) |
|---|---|---|
| Lysolecithin-5 | 99.66% Lysolecithin 0.34% Vitamins | 50 |
| Lysolecithin-6 | 83.33% Lysolecithin 16.67% Sterols | 42 |

TABLE 6

Dispersibility in Water

| Example No. | | Total Dispersibility in Water, seconds |
|---|---|---|
| LECIGRAN 6000 G IPM Lot 2035 | | 32 |
| Degussa EPIKURON 100 G | | 24 |
| LECIGRAN 6000 G Lot 2032 | | 13 |
| L1 | 100% Lecithin | 27 |
| L2 | 100% Lecithin | 29 |
| L3 | 99.66% Lecithin 0.34% Vitamins | 21 |
| L4 | 100% Lecithin | 30 |
| L6 | 83.33% Lecithin 16.67% Sterols | 62 |
| Lysol-1 | 100% Lysolecithin | 15 |
| Lysol-2 | 100% Lysolecithin | 15 |
| Lysol-4 | 100% Lysolecithin | 15 |
| Lysol-5 | 99.66% Lysolecithin 0.34% Vitamins | 15 |
| Lysol-6 | 83.33% Lysolecithin 16.67% Sterols | 90 |

TABLE 7

Wettability in Water

| Example No. | | Wettability |
|---|---|---|
| LECIGRAN 6000 G IPM Lot 2035 | | floating at the top |
| Degussa EPIKURON 100 G | | floating at the top and are sedimenting very slowly (more than 10 min) |
| LECIGRAN 6000 G Lot 2032 | | sinks directly to the bottom <5 s |
| L1 | 100% Lecithin | sinks directly to the bottom <5 s |
| L2 | 100% Lecithin | sinks directly to the bottom <5 s |
| L3 | 99.66% Lecithin 0.34% Vitamins | sinks directly to the bottom <5 s |
| L4 | 100% Lecithin | sinks directly to the bottom <5 s |
| L6 | 83.33% Lecithin 16.67% Sterols | sinks directly to the bottom <5 s |
| Lysolecithin-1 | 100% Lysolecithin | Floats at the top and starts slowly to sediment |
| Lysolecithin-2 | 100% Lysolecithin | Same start at the top, but faster sedimentation than Lysol 1 |
| Lysolecithin-4 | 100% Lysolecithin | not enough product |
| Lysolecithin-5 | 99.66% Lysolecithin 0.34% Vitamins | Floats at the top, but starts to sediment rather quickly |
| Lysolecithin-6 | 83.33% Lysol 16.67% Sterols | Floats at the top and starts slowly to sediment |

TABLE 8

Dissolvability in Soybean Oil

| Example No. | Dissolvability (minutes) |
|---|---|
| LECIGRAN 6000 G IPM Lot 2035 | >15 |
| Degussa EPIKURON 100 G | >15 |
| LECIGRAN 6000 G Lot 2032 | >15 |
| L1 granules | >15 |
| L6 granules | >15 |
| Lysolecithin-1 | >15 |
| Lysolecithin-6 | >15 |

The disclosure has been described with reference to various specific and illustrative embodiments and techniques. However, one skilled in the art will recognize that many variations and modification may be made while remaining within the spirit and scope of the disclosure.

What is claimed is:

1. A process for producing granular lecithin comprising forming a film comprising deoiled lecithin powder, wherein the film is formed using compression or die pressing, and milling the resultant film at a temperature of less than or equal to 0° C., in the absence of binder, antistick agent or mixture thereof.

2. The process to claim 1 wherein the deoiled lecithin powder has an acetone insoluble matter of at least 90%.

3. The process according to claim 1 wherein the film is formed by compression or die pressing.

4. The process according to claim 3 wherein the film is formed by a roller compaction granulator.

5. The process according to claim 1 wherein the film is milled at a temperature ranging from 0° C. to about −25° C.

6. The process according to claim 1 wherein the milling is selected from a conical screen mill, a mesh screen mill, or knife milling.

7. The process according to claim 6 wherein the milling is mesh screen milling.

8. A process for producing a granular lecithin composition comprising:
  a. mixing deoiled lecithin powder with additive;
  b. forming a film from the resultant mixture using compression or die pressing; and
  c. milling the resultant film at a temperature of less than or equal to 0° C.; in the absence of binder, antistick agent or mixture thereof.

9. The process according to claim 8 wherein the deoiled lecithin powder has an acetone insoluble matter of at least 90%.

10. The process according to claim 8 wherein the additive is selected from the group consisting of a nutraceutical, a drug, a pharmaceutical, a flavor, a pigment, a vitamin, a food, an enzyme, an amino acid, a protein and a mixture thereof.

11. The process according to claim 8 wherein the film is milled at a temperature of 0° C. to about −25° C.

12. The process according to claim 8 wherein the milling is selected from a conical screen mill, a mesh screen mill, or knife milling.

13. A process for producing a granular lysolecithin composition comprising:
  a. mixing deoiled lysolecithin powder with an additive;
  b. forming a film from the resultant mixture using compression or die pressing; and
  c. milling the resultant film at a temperature of less than or equal to 0° C., in the absence of binder, antistick agent, or a mixture thereof.

14. The process according to claim 13 wherein the deoiled lysolecithin powder has an acetone insoluble matter of at least 90%.

15. The process according to claim 13 wherein the additive is selected from the group consisting of a nutraceutical, a drug, a pharmaceutical, a flavor, a pigment, a vitamin, a food, an enzyme, an amino acid, a protein and a mixture thereof.

16. The process according to claim 13 wherein the film is milled at a temperature ranging from 0° C. to about −25° C.

17. The process according to claim 13 wherein the milling is selected from a conical screen mill, a mesh screen mill, or knife milling.

* * * * *

UNITED STATES PATENT AND TRADEMARK OFFICE
CERTIFICATE OF CORRECTION

PATENT NO. : 8,535,750 B2  
APPLICATION NO. : 11/914727  
DATED : September 17, 2013  
INVENTOR(S) : Myong Kon Ko et al.

Page 1 of 1

It is certified that error appears in the above-identified patent and that said Letters Patent is hereby corrected as shown below:

On the title page
Item 56, column 2, under "OTHER PUBLICATION" line 16, before "J. Amer", delete "53(6):425-427".

In the specifications
In column 6, lines 66-67, after "Incorporated" insert -- . --.

In column 7, line 30, after "Sieve Fraction Granules" delete "≥" and insert -- < --, therefor.

In column 8, line 24, after "60mm)" insert -- . --.

In column 11, line 13, after "Table 2" insert -- . --.

In the claims
In column 14, line 24, in claim 2, after "The process" insert -- according --.

Signed and Sealed this
Tenth Day of December, 2013

Margaret A. Focarino
*Commissioner for Patents of the United States Patent and Trademark Office*